United States Patent [19]

Raymond et al.

[11] 4,300,654

[45] Nov. 17, 1981

[54] UNDERSEA IMPLOSION DEVICE

[75] Inventors: Samuel O. Raymond; Gary G. Hayward, both of Falmouth, Mass.

[73] Assignee: Benthos, Inc., Falmouth, Mass.

[21] Appl. No.: 151,914

[22] Filed: May 21, 1980

Related U.S. Application Data

[63] Continuation of Ser. No. 665,234, Mar. 9, 1976, abandoned.

[51] Int. Cl.³ .............................................. G01V 1/38
[52] U.S. Cl. ................................. 181/120; 181/113; 181/115; 367/146
[58] Field of Search ............... 181/110, 112, 113, 115, 181/116, 120; 367/146

[56] References Cited

PUBLICATIONS

"Hollow Glass Spheres Under Pressure in the Ocean", Raymond, *IEEE Ocean 75*, Sep. 1975, pp. 537–544.
"Implosions as Sources of Underwater Sound", Urick, U.S. Naval Ordinance Laboratory, Oct. 1963.
"The Ball Breaker, A Deep Water Bottom Signalling Device", Issacs et al, *Journal of Marine Research*, vol XI, No. 1, pp. 63–69, 1952.
"The Resistance of Hollow Glass Spheres Models to Underwater Explosions at Great Depths III, Spheres with Overlays", Naval Ordinance Laboratory, Heathcote, NOLTR66-78, May 1966.
"The Resistance of Hollow Glass Models to Underwater Explosions at Great Depths III, Special Configurations", Naval Ordinance Laboratory, Faux, NOLTR-65-146, Oct. 1965.

*Primary Examiner*—Howard A. Birmiel
*Attorney, Agent, or Firm*—Schiller & Pandiscio

[57] ABSTRACT

A method is described for causing hollow glass spheres to implode on command while deep in the ocean, whereby to produce an acoustic pulse. Specific means for causing the spheres to implode are described. The invention is useful for seismic work.

20 Claims, 9 Drawing Figures

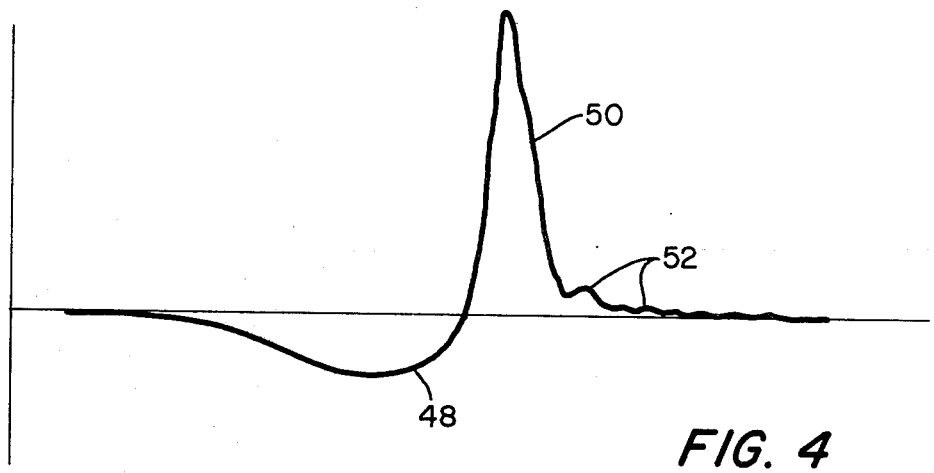
FIG. 4
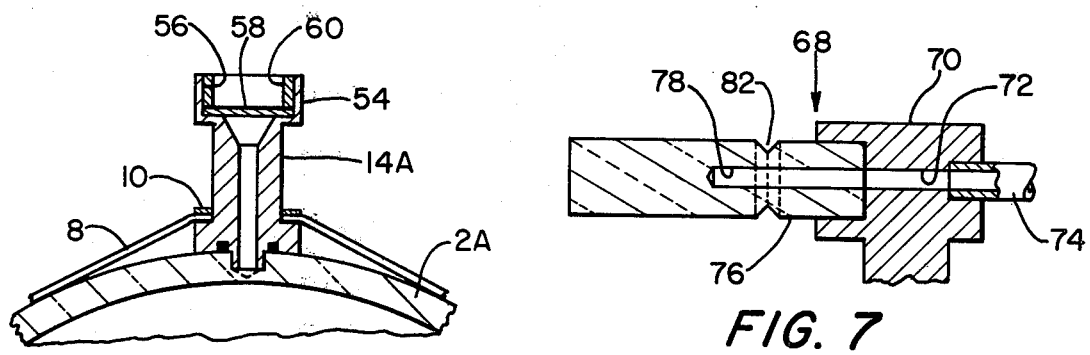
FIG. 5
FIG. 7
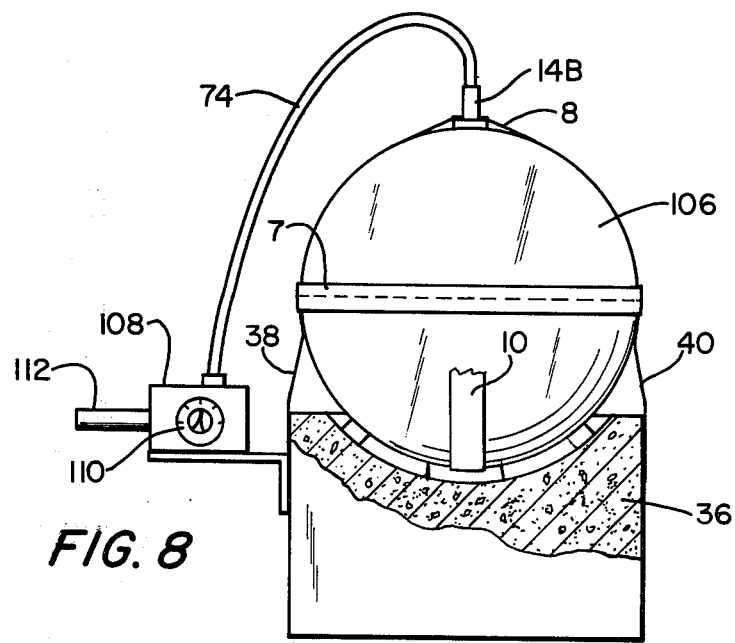
FIG. 8

UNDERSEA IMPLOSION DEVICE

RELATED APPLICATION

This application is a continuation of U.S. Application Ser. No. 665,234 filed Mar. 9, 1976, now abandoned.

This invention relates to the art of producing sounds under-water and more particularly to methods and apparatus for producing acoustic energy pulses deep in the ocean.

The use of explosives to produce sound pulses in the deep ocean for seismic and refraction purposes is well known. However, explosives are hazardous to handle on board ship and the amount of explosive required to produce sounds capable of being detected and discriminated with seismic instrumentation increases with the depth at which the explosion is to occur. It also has been suggested that sounds may be generated in the deep ocean by imploding glass spheres on command by using mechanical impact devices or small explosives to initiate implosion. However, these attempts have failed, as reported by S. O. Raymond, Hollow Glass Spheres Under Pressure In the Ocean—Experiments Show Interesting Properties, IEEE Ocean '75, pages 537–544.

The primary object of this invention is to provide a method and apparatus for producing sound pressure at great ocean depths which is totally benign at the ocean surface.

Another object is to provide a method and apparatus for producing sounds underwater at a selected depth without the use of explosives or electromechanical or electronic sound generating transducers.

A further object is to provide a novel method and apparatus for producing sounds underwater at or near the ocean floor or at various depths, on command or automatically at selected depths. Another more specific object is to provide a system of the character described whereby a plurality of sound pulses may be generated underwater with the sound pulses all occurring at the same depth or at different depths and at substantially the same time or sequentially.

These and other objects are achieved by providing a glass sphere and selectively weakening a predetermined region of the wall of the sphere, whereby at a selected ocean depth the ambient hydraulic pressure will blow in that region of the wall and cause total implosion of the sphere. The implosion produces a substantial and identifiable pressure pulse in the ocean which can be used for various purposes. The sphere may be adapted to implode at a selected depth on command or automatically without command. Several spheres may be used together so that they will implode substantially at the same time or in a selected sequence at the same depth or at different depths.

Other features and advantages of this invention are disclosed or rendered obvious by the following detailed description which is to be considered together with the accompanying drawing wherein:

FIG. 4 is a waveform illustrating the pressure pulse which is produced by implosion of a hollow glass sphere in the deep ocean;

FIG. 5 is a fragmentary sectional view illustrating a specific form of implosion initiator assembly;

FIG. 7 is an enlarged longitudinal sectional view of the valve used in the implosion initiator assembly of FIG. 6;

FIG. 8 is an elevational view illustrating another form of implosion initiator assembly.

In the practice of this invention the glass spheres are of the type conventionally employed as buoyancy devices. Preferably the spheres are of the type disclosed in U.S. Pat. No. 3,587,122 and described in the aforementioned article by S. O. Raymond. The spheres also may be made by other methods, e.g. in the manner disclosed by U.S. Pat. No. 3,563,089.

Figure 1:
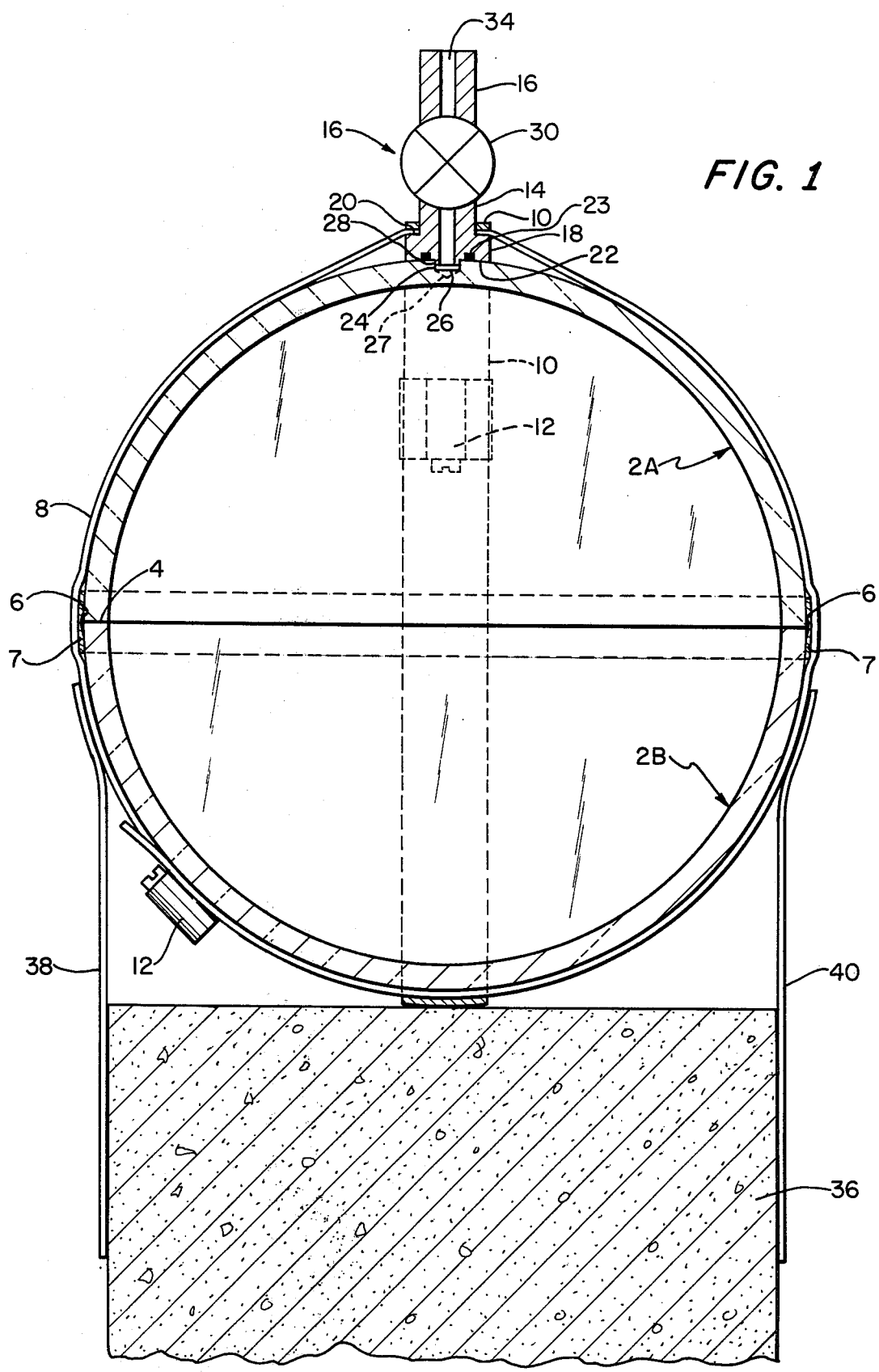
FIG. 1 is a sectional view in side elevation of a preferred form of the invention which embodies an implosion initiator assembly, with the valve of the latter being represented schematically.

Referring now to FIG. 1, the illustrated device comprises a hollow glass sphere made up of two identical glass hemispheres 2A and 2B. These hemispheres have flat mating surfaces forming a seam 4 around the equator of the sphere. The seam is covered by a continuous bead of a non-hardening flexible sealant 6 which is applied around the entire length of the seam and is covered by and held thereto by a flexible adhesive tape 7 in the manner described in said U.S. Pat. No. 3,587,122. Preferably the sphere is partially evacuated before the seam 4 is completely sealed off, with the result that the surrounding atmospheric pressure forces the hemispheres together tightly so that they cannot come apart or slip relative to one another. Further details of the manner of securing the hemispheres together are provided by U.S. Pat. No. 3,587,122. Two flexible steel belts 8 and 10 are disposed around the sphere at right angles to one another. The belts extend over the tape 7 and the opposite ends of each belt are held together by means of clamps 12. The clamps hold the belts tightly against the sphere. The primary purpose of belts 8 and 10 is to provide means for attaching the implosion initiator assembly 10 and ballast unit 36 to the sphere. However, the belts also can act to hold the hemispheres together and prevent them from slipping relative to one another and this function is important in the case where the sphere may not be evacuated enough for the atmospheric pressure to hold the hemispheres tight against one another (the sphere may be evacuated or filled with air or other fluid).

Figure 2:
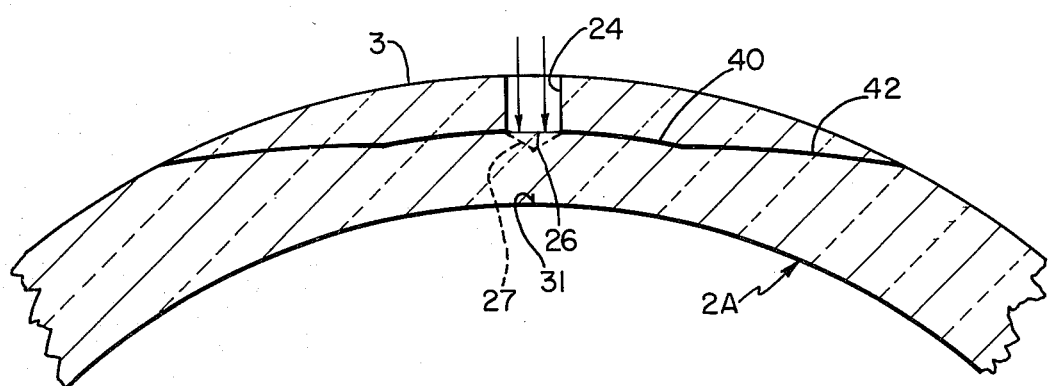
FIG. 2 is an enlarged and fragmentary sectional view illustrating how a portion of the wall of the sphere of FIG. 1 is spalled off by hydraulic fracturing when the valve of the implosion initiator assembly is actuated.

Still referring to FIG. 1, for this invention the belts 8 and 10 are formed with aligned apertures to accommodate a tubular fitting 14 which forms part of an implosion initiator assembly identified generally by the numeral 16. The fitting 14 includes a flange 18 having a shoulder 20 which is engaged by the belt 8 and an end surface 22 with a groove to accommodate an O-ring 23 which forms a seal between the flange and the outer surface of hemisphere 2A. The latter is formed with a blind hole 24 which may terminate in a flat end surface 26 or may even be conically tapered as shown at 27. The end of the fitting 14 is provided with a tubular extension 28 which fits loosely in the blind hole 24 and terminates short of its end surface 26 as shown in FIG. 2. The belts 8 and 10 coact with the flange 18 to hold the fitting against the hemisphere 2A with sufficient force for O-ring 23 to prevent fluid from entering between the flange 18 and the hemisphere 2A.

The implosion initiator assembly 16 further includes a water flow control means which is represented schematically as a valve 30. This water flow control means is adapted to prevent water from passing through the inner passageway 34 of the fitting 14 into the hole 24 until a predetermined condition, event or state occurs. Specific forms of valves are disclosed in FIGS. 5-8 as hereinafter described.

A weight or ballast unit 36 is coupled to the hollow sphere in order to assure that the latter will sink when dropped into a deep body of water such as the ocean or sea. The ballast may consist of a block of concrete or metal, or a casing filled with concrete, stones or metal. The weight or ballast 36 may be attached to the sphere in various ways. One convenient way is to attach a pair of flexible metal straps 38 and 40 to the belt 8 by spot welding or by other convenient means. The opposite ends of the straps 38 and 40 may be connected to the ballast in any suitable manner as for example, spot welding, riveting, screw fasteners, etc. Still other methods of securing the ballast to the sphere will be obvious to persons skilled in the art.

The compressive strength of glass is quite high and, for example, a glass sphere made as described above and measuring about 17 inches in diameter and with a wall thickness of about 0.56 inch, will withstand a compressive pressure in excess of 10,000 p.s.i.g. Therefore, if such a sphere is used in the embodiment of FIG. 1, it will be capable of sinking to great depths, e.g. 6700 meters, without imploding so long as valve 30 remains closed so that water cannot flow into the blind hole 24 and provided that the two hemispheres have no structurally weakened areas other than where the hole 24 is formed. However, if valve 30 is opened while the sphere is submerged at a great depth, the water which is introduced into blind hole 24 will press on the bottom end 26 of the hole and will set up tension stresses radially around hole 26. If the force exerted by the water on the bottom of the blind hole is sufficient, a circular crack will form around the bottom of the hole. The water will then enter the crack and will cause the crack to rapidly expand and propogate within the glass wall laterally of the axis of the hole. More specifically the high pressure water will cause a tension crack or fracture to form and propogate radially from hole 24 in all directions, i.e. around the full circumference of the hole, with the result that a piece of the hemisphere 2A will spall off.

Figure 3:
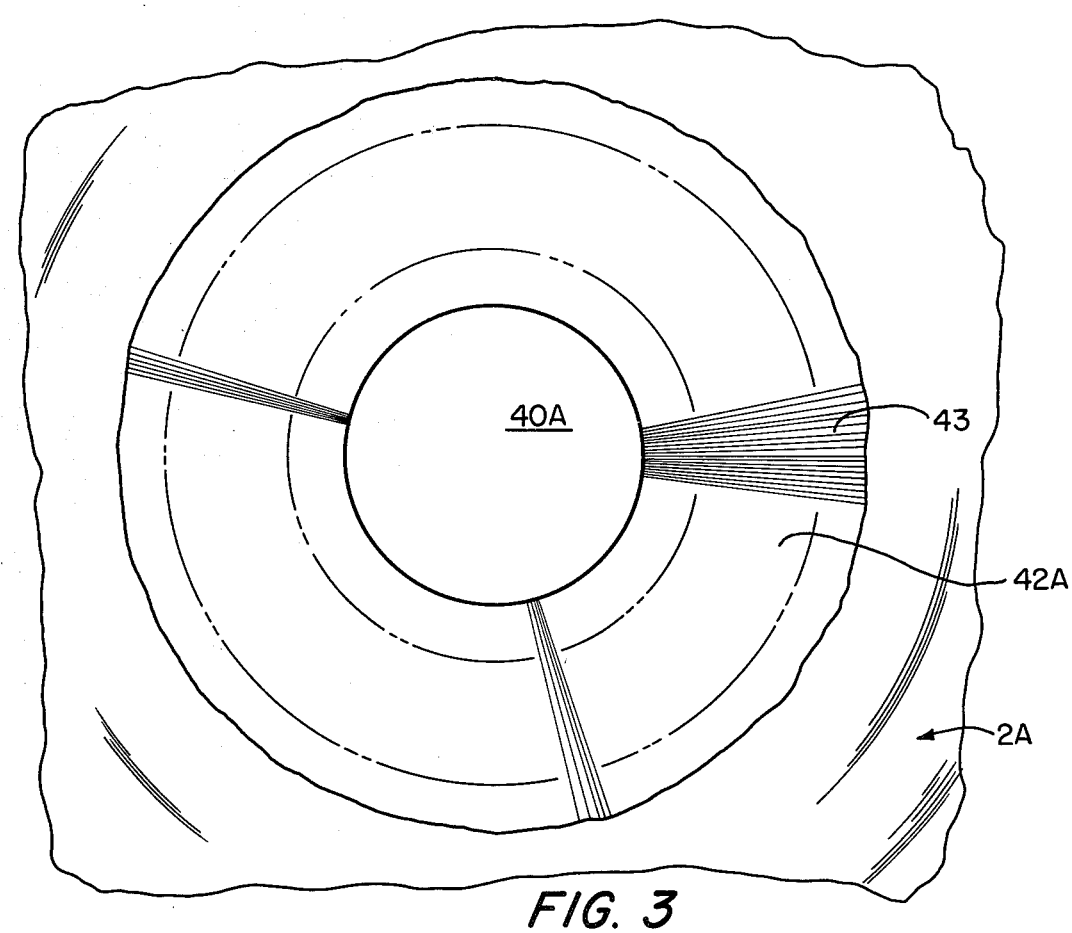
FIG. 3 is an enlarged and fragmentary plan view of the sphere wall section of FIG. 2 illustrating the exterior appearance of the wall where spalling has occurred by hydraulic fracturing.

This hydraulic fracturing phenomenon is illustrated in FIG. 2. The arrows signify that water is introduced under pressure into the blind hole 24 and the numeral 3 designates the portion of the wall which is spalled off of the hemisphere 2A. If the pressure is sufficient, the wall of the hemisphere 2A will fracture hydraulically around the hole 24 with fracturing occurring first along a spherically curved fracture surface 40 which has a radius of curvature which is in between that of the inner and outer surfaces of hemisphere 2A. Thereafter, the fracture continues uniformly along a surface 42 which has a different radius of curvature than the line 40. With reference to FIG. 3, the initial portion of the fracture represented by line 40 in FIG. 2 forms a highly polished "mirror" surface 40A which has an almost perfect circular edge, while the remaining portion of the fracture forms an annular surface 42A having a cross-sectional curvature as represented by line 42 in FIG. 2. The outer margin of surface 42A is circular but is slightly irregular rather than smooth. Additionally, the annular surface 42A is not smooth but instead is characterized by a series of radially-extending closely-spaced fine ridges or "hackles" 43. Once this spalling has occurred, the remaining portion of the spalled section of the wall of the hemisphere 2A is then comparatively weak with respect to the remainder of the same hemisphere, with the result that the hydraulic pressure exerted by the surrounding water will cause the weakened portion of the hemisphere 2A to fracture and blow a large hole inwardly. This initiates a full and complete implosion of the sphere. The sphere breaks up into microscopic size bits of glass when it implodes. When the implosion occurs, water rushes in to fill the void, thereby creating a rarefaction or negative (relative to ambient) pressure pulse. When the water rushing in to fill the cavity comes together, a large positive pressure pulse is created. Succeeding oscillations of pressure are brief and exhibit high damping.

FIG. 4 illustrates the waveform of the pressure wave produced when the sphere is imploded. The initial negative excursion of the wave form identified by the numeral 48 represents the negative pressure pulse provided by the collapsing of the sphere, while the positive excursion 50 represents the positive pressure pulse produced as a result of the coming together of the water surrounding the sphere. The large pressure pulse 50 is followed by only a few progressively decreasing pressure pulses 52. The magnitude of the pressure pulses 52 are relatively small in comparison with the large pressure pulse 50 and as a matter of practicality the sonic signal produced by the positive pressure pulse decays to an insignificant level within about 0.2 milliseconds. At a depth of about 4000 meters the available energy for implosion is converted to sound with an efficiency in excess of 10%. In contrast the explosion energy of TNT at the same depth is converted to sound with an efficiency of only about 1%. The energy available for implosion also increases with increasing depth; in contrast the sound produced by a given amount of TNT does not increase with increasing ocean depth.

It is to be noted that the implosion is a consequence of compressive and tensile stresses set up in the glass. As the sphere descends in the ocean, pressure builds up on the outside and this causes compressive stresses in the glass. These stresses are substantially uniform around the whole sphere. However, as soon as spalling occurs as described above, tensile stresses are set up in the glass in the region of surfaces 40A and 42A. This tensile stress is greatest on the inside surface of the glass hemisphere 2A at a point represented by the short line 31 which is in line with hole 24. Since glass is more than about ten times weaker in tension than it is in compression, fracture will occur in the region of surfaces 40A and 42A when the tensile stress at point 31 reaches the tensile strength of the glass. Since the entire region of glass surrounding point 31 is in tension, once fracture starts at point 31 it quickly propogates outward. The fracturing manifests itself as a hole blown in the sphere. This relieves the compressive stress in the rest of the sphere, which brings the sphere back into tension and thereby causes the whole sphere to collapse and break into a myriad of microscopic size bits. It is interesting to note also that the fracturing that causes the spalling when water is introduced into hole 24 also produces a crackling low intensity sound which can be heard with a hydrophone placed near the sphere. If opening of the valve 30 is delayed until the surrounding water pressure is great enough to cause implosion of the sphere provided spalling has already occurred, the implosion will occur almost instantaneously after spalling. Otherwise there may be a time delay occurring before implosion occurs.

Sonic energy pulses produced by imploding spheres as herein described may be used for refraction and seismic purposes. The implosion pressure pulse also may be used to do actual work in the deep ocean such as to cut a wire which is located in proximity to the sphere or to produce a hole in the side of a vessel. The sound produced by implosion of the sphere may be heard at relatively long distances and can be readily detected by sonic transducers due to the fact that the energy spectrum of the pulse ranges from about 100 to about 5000 hertz and peaks between about 300 and about 600 hertz. For seismic work e.g. for oil and gas exploration, it is preferred that the sphere be imploded near or on the ocean floor so that a substantial portion of its energy will be transmitted strongly into the ocean floor. The invention also may be used to signal the arrival of a device at a certain depth or on the ocean floor, e.g. to indicate the crash of an airplane at sea. In this connection it is to be noted that the sphere may be secured to or captivated within a compartment of an aircraft so that the two will sink together after the aircraft has crashed at sea, in which case separate ballast 36 may be dispensed with since the aircraft functions as the ballast required to cause the sphere to sink to the depth needed to initiate implosion.

Obviously the implosion initiator assembly may be designed so that the sphere will implode automatically at a selected depth or on command. The implosion initiator assembly may be arranged to implode on command of an electrical signal fed down from above the surface of the ocean by a cable attached to the assembly, or a signal from a timer, or an acoustical signal generated from a deep ocean source or from near the surface of the ocean.

FIG. 5 illustrates a modification of the fitting 14 which incorporates a valve of the rupturable disc type. In this case fitting 14A is formed with an enlarged collar 54 and a counterbore 56 at its outer end. Fitted in the counterbore 56 is a rupturable disc 58 which is secured in place by a sleeve 60. The latter may be secured to the surrounding portion of fitting 14A by welding or a sweat or friction fit or by riveting or other means. The disc 58 is made of a material having the capability of withstanding rupturing until subjected to a predetermined tensile stress. Thus, the disc 58 may be made of glass or a metal and may have a thickness and composition such that it will fracture only when subjected to a hydraulic pressure above a predetermined level. In this way the disc 58 may be designed so that it will rupture and permit water to flow into the blind hole 24 after the sphere has dropped to a predetermined depth in the ocean. Once water is admitted to the blind hole, hydraulic implosion of the sphere occurs as described above. It is to be appreciated that rupture disks as shown at 58 not only are well known but also are commercially available in different sizes and materials and are calibrated to rupture at predetermined depths.

Figure 6:
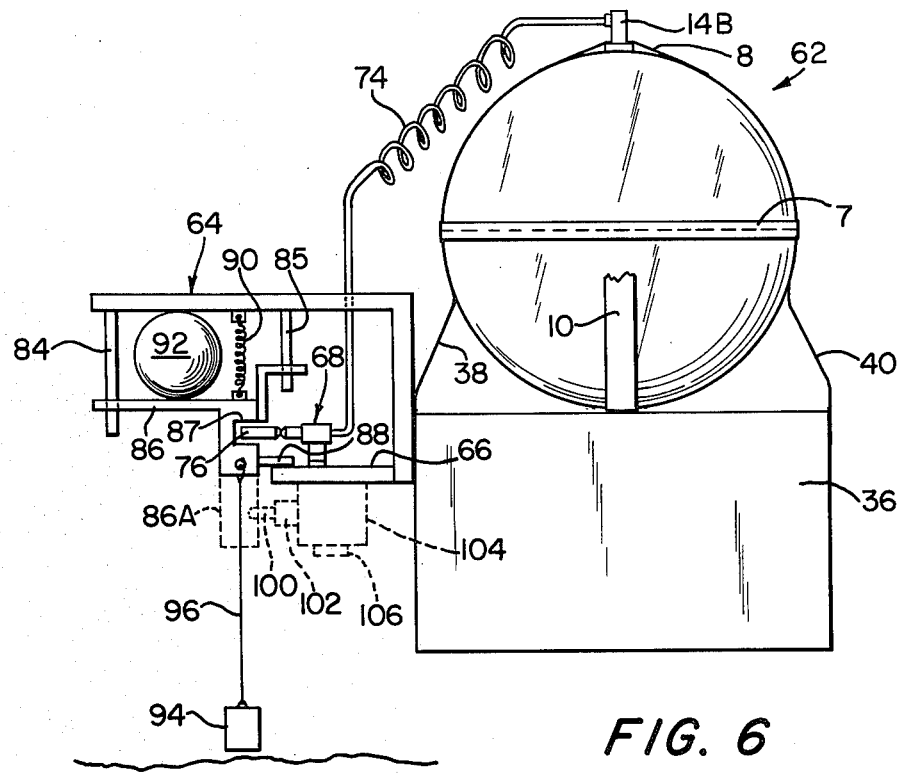
FIG. 6 is a elevational view illustrating another form of implosion initiator assembly.

FIGS. 6 and 7 illustrate a modification of the device which is arranged so that the sphere will implode at the bottom of the ocean. In this modification the glass sphere 62 nests in a recess in the ballast 36, with the latter being attached to the sphere by means of straps (not shown) corresponding to straps 38 and 40. Attached to the side of ballast 36 is a bracket 64 having a shelf 66 secured to it. Mounted on shelf 66 is a valve unit 68. As seen in FIG. 7, the valve unit 68 comprises a fitting 70 having an internal passageway 72 which is counterbored at one end to receive the end of a flexible metal tube 74. The opposite end of tube 74 is connected to a fitting 14B which is similar to fitting 14A except that it lacks the rupturable disc 58 and sleeve 60 and instead is adapted to make a permanent connection to tube 74. The opposite end of fitting 70 has a counterbore for receiving an expendable valve element 76. The latter may be made of metal or glass and includes a blind hole 78 which connects with passageway 72. Additionally the valve element 78 is provided with a circumferential groove 82 to facilitate breaking off its free end to expose passageway 72 to the surrounding environment.

Referring further to FIG. 6, the bracket 64 is provided with two slide rods 84 and 85 on which is slidably mounted a valve trigger member 86. The latter is provided with a notch 87 to receive the outer end of the valve element 76. It also has an arm 88 which rests on the shelf 66 and acts as a stop. A tension spring 90 is connected between the bracket 64 and trigger member 86 and urges the latter upwardly so as to move arm 88 away from the shelf 66. A hollow rubber ball 92, which preferably is a tennis ball, is disposed between the bracket 64 and trigger member 86. The ball 92 acts as an arming device as hereinafter described. Completing the implosion initiating mechanism is a pilot weight 94 which is attached to trigger member 86 by a cable 96.

The purpose of the ball 92 is to oppose the force of spring 90 and hold trigger member 86 stationary with its arm 88 engaging shelf 66. When the unit shown in FIG. 6 is lowered into the water from a vessel, it will sink under the combined force of weights 36 and 94. After the unit has submerged a sufficient distance, the ball 92 will collapse and float out from between bracket 64 and member 86, whereupon the spring 90 will attempt to move trigger member 86 upwardly. However, the weight 94 is sized so as to exert a force on trigger member 86 which is greater than the opposing force exerted by spring 90, and thus the trigger member will be held down with its stop arm 88 engaging shelf 66 until the pilot weight 94 comes to rest on the ocean floor. When this occurs, the cable 96 will go slack and allow spring 90 to pull trigger member 86 upwardly and thereby cause it to engage and break off the end portion of the valve element 76. This immediately exposes the passageway 72 and allows water to flow through the tube 74 to the initiator assembly fitting 14B whereupon the sphere will undergo hydraulic fracturing, spalling and implosion as above described.

As an alternative, the arrangement of FIG. 6 may be modified by eliminating the pilot weight 94 and by providing trigger member 86 with a bottom extension 86A which has a cavity to receive the armature 100 of a solenoid 102 which forms part of a receiver unit 104 that includes a hydrophone 106. The receiver 104 may be adapted so that the armature 100 remains engaged with the trigger member until an acoustic command signal is received by hydrophone 106, whereupon the receiver energizes the solenoid 102 so as to cause its armature to retract far enough to release trigger member 86. In such event, the spring 90 will again cause the trigger member 86 to move upwardly to break off the valve member 76 as previously described.

With reference to the receiver 104, it is to be noted that the transducer 106 may be adapted to respond to acoustic signals which are generated by a source located near the surface or deep in the ocean, e.g. by an acoustic transmitter tethered to a surface vessel or mounted to a submarine.

FIG. 8 shows a further modification of the invention wherein the glass sphere 106 is attached to ballast 36 in the same manner as illustrated in FIG. 6. In this case, however, the tube 74 is attached to one port of a normally closed valve 108 which is adapted to be operated by a manually adjustable mechanical timer 110. The valve 108 is normally closed and the timer is arranged to be preset manually so that it will open the valve after a selected period of time. By way of example, the timer may be arranged so that it can be set to open the valve at any time within a period of 1–30 hours. The valve 108 has an inlet port 112 through which water is introduced to the valve and thereby to tube 74 when the valve is opened by operation of timer 110.

Details of valve 108 and timer 110 are not provided since such units are well known to persons skilled in the art.

As another possible modification, valve 110 could be a normally closed solenoid valve and could be connected to a trailing-electrical cable that is coupled to a transmitter above the surface of the ocean. With such an arrangement, the valve could be made to open on command or at any selected depth by an energizing signal transmitted to the valve operating solenoid via the cable.

It is to be noted that the sphere shown in FIG. 1 also may be used without any imploder initiator assembly, in which case water will be admitted to the hole 24 as soon as the sphere is submerged and the sphere will implode after (1) spalling has occurred and (2) the sphere has reached a depth where the hydraulic pressure is sufficient to collapse the weakened portion of its wall as above-described. By suitably proportioning the hole 24, it is possible to assure that the sphere will implode when it has dropped to a predetermined depth. The deeper the hole 24, the shallower the depth at which implosion will occur. As an alternative, the hole 24 may be replaced by a groove which extends through a selected arc, e.g. approximately through about 30° of the circumference of the sphere and has a cross-section similar to that of the hole 24.

Figure 9:
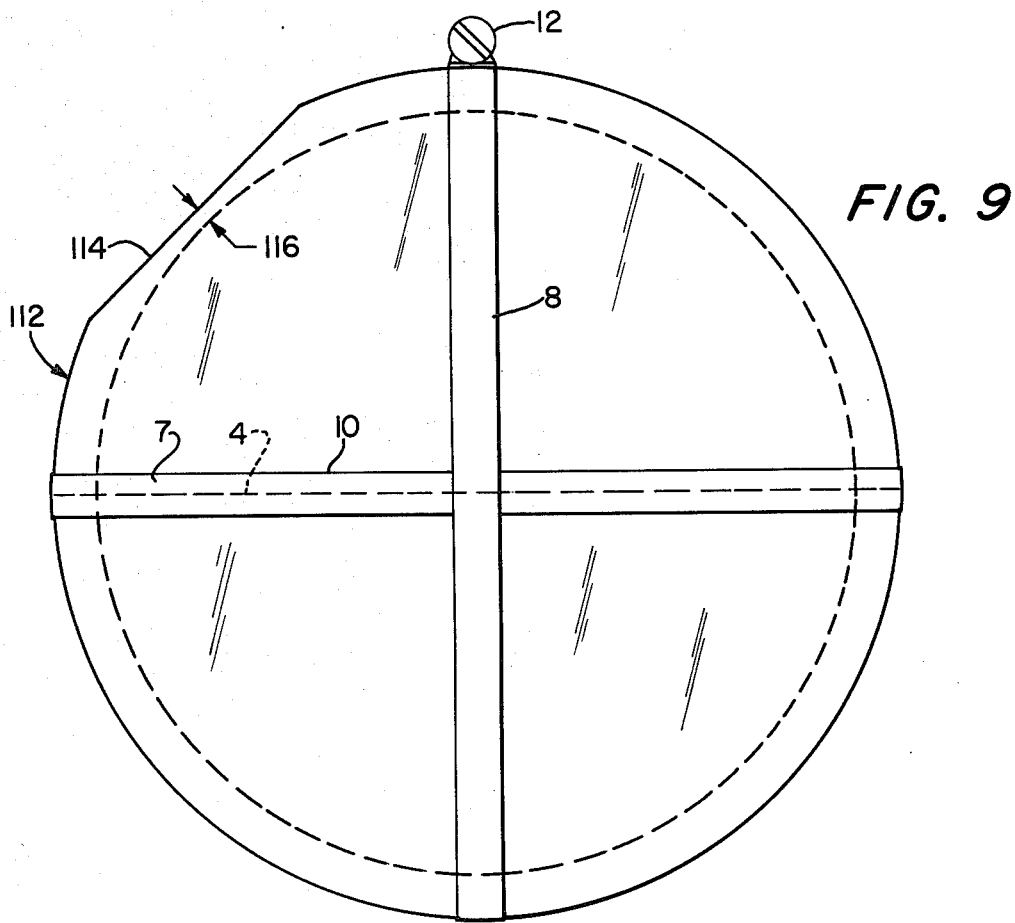
FIG. 9 illustrates an implosion device which does not embody an implosion initiator assembly.

Provision of spheres which are imploded automatically at a fixed depth also may be achieved by merely grinding a flat on the surface of the sphere. Such a modification is disclosed in FIG. 9 wherein the sphere 112 is provided with a flat 114. The size of the flat 114 will determine the depth at which the sphere will implode, since the size of the flat will determine the minimum wall thickness of the sphere at the center of the flat, i.e. at the area determined by the opposing arrows 116. Grinding a flat on a sphere is relatively easy; it also is relatively easy to determine the size of the flat required in order to have a given sphere implode automatically at a selected depth.

Still other modifications of the invention are contemplated. Thus, for example, it is possible to arrange a number of spheres so that they are all imploded at once or at various times. If the spheres are to go off substantially simultaneously, they may be arranged close together, preferably touching, so that the implosion of one sphere will cause the others to go off by sympathetic implosion. In such case only one of the spheres is required to have an implosion initiator assembly, while the other spheres may be provided with deformations such as a hole 24 or a flat 114 which will facilitate their being imploded sympathetically. A preferred arrangement is to have the sphere with the initiator assembly located at the center and the other spheres which are to go off by sympathetic implosion arranged around the first sphere in the manner of satellites. It is also contemplated that if the spheres are to be triggered at various times or selectively, they should be mounted at least several meters apart so that sympathetic implosion cannot occur. In such case, each of the spheres would be adapted to implode on command or automatically at different depths; e.g. by use of timer-controlled valves of the kind shown at FIG. 8 or by different sized flats as shown at 114 in FIG. 9, or by acoustically triggered valves as shown in FIG. 6. It is to be appreciated also that acoustical pulse shaping may be attempted by placing the spheres close together in a series array so that after the first sphere is imploded, the others will be triggered sequentially by sympathetic implosion. This will give a longer, lower frequency pulse which also is directional.

It is to be appreciated that the sphere may be made of materials other than glass, with the choice of material depending upon the depth to which the sphere is required to sink before imploding. The essential thing is to make the sphere out of a brittle material or a material which becomes brittle at the temperatures of deep ocean water. By way of example, the spheres could be made of a thermosetting plastic such as an epoxy or phenol-formaldehyde resin or a thermoplastic resin such as polypropylene, or it may be a cast metal such as iron. The brittle quality is required in order that the sphere will implode rapidly instead of breaking up slowly.

Other modifications and advantages of the invention will be obvious to persons skilled in the art.

We claim:

1. An implosion device for generating a pressure pulse in a deep body of water, said device comprising a hollow glass sphere, first means for causing the sphere to sink when dropped into the water, and second means including a deformation at the outer surface of said sphere for causing said sphere to implode when subjected to a hydraulic pressure which exceeds a predetermined magnitude.

2. An implosion device according to claim 1 wherein said second means comprises a flat formed on said outer surface.

3. An implosion device according to claim 1 wherein said second means comprises a blind hole in the wall of said sphere.

4. An implosion device according to claim 3 wherein said second means also comprises an implosion initiator assembly arranged to expose said blind hole to the hydraulic pressure exterior of said sphere only when a predetermined condition or event occurs.

5. An implosion device according to claim 4 wherein said assembly comprises a normally closed valve disposed so that ocean water can flow into said blind hole only when said valve is opened.

6. An implosion device according to claim 5 wherein said valve is timer actuated.

7. An implosion device according to claim 4 wherein said assembly is arranged so that said valve closes in response to a control signal.

8. An implosion device according to claim 7 wherein said signal is generated by a bottom-sensing device.

9. An implosion device according to claim 7 wherein said signal is generated by a remote device.

10. An implosion device according to claim 7 wherein said signal is an electrical signal.

11. An implosion device according to claim 7 wherein said signal is an acoustic signal.

12. An implosion device according to claim 4 wherein said assembly comprises a closed tube and means for opening said tube on command.

13. An implosion device according to claim 12 wherein said assembly comprises an arming device for preventing opening of said tube until a minimum hydraulic pressure exists.

14. An implosion device according to claim 4 wherein said assembly is arranged to expose said hole to the hydraulic pressure exterior of said sphere when said hydraulic pressure exceeds a predetermined value.

15. An implosion device according to claim 5 wherein said assembly comprises a pressure-responsive valve.

16. Method of generating a pressure pulse in a deep body of water comprising producing a hollow glass sphere, adapting a portion of the wall of said sphere so that said portion is capable of withstanding less compressive strain than the remainder of said wall and will cause said sphere to implode when subjected to an exterior hydraulic pressure in excess of a predetermined minimum pressure, sinking said sphere in said deep body of water, and subjecting said sphere to a hydraulic pressure exerted by said water in excess of said predetermined minimum pressure so as to cause said sphere to implode and produce a pressure pulse in said deep body of water.

17. Method according to claim 16 wherein said portion of the wall of said sphere is adapted by forming a deformation on the outer surface of said wall portion.

18. Method according to claim 16 wherein said portion of the wall of said sphere is adapted by forming a blind hole in said wall portion.

19. Method according to claim 18 wherein said hole is blocked off from said hydraulic pressure until said sphere has sunk to a selected depth.

20. Method according to claim 16 wherein a weight is attached to said sphere to cause it to sink.

* * * * *